(12) United States Patent
Saint-Jalmes

(10) Patent No.: US 7,354,018 B2
(45) Date of Patent: Apr. 8, 2008

(54) AIRCRAFT CABIN MODULE FOR PASSENGERS

(75) Inventor: Bruno Saint-Jalmes, Toulouse (FR)

(73) Assignee: Airbus, Blagnac (FR)

( * ) Notice: Subject to any disclaimer, the term of this patent is extended or adjusted under 35 U.S.C. 154(b) by 0 days.

(21) Appl. No.: 10/477,631

(22) PCT Filed: Jul. 15, 2003

(86) PCT No.: PCT/FR03/02228

§ 371 (c)(1),
(2), (4) Date: Jul. 19, 2004

(87) PCT Pub. No.: WO2004/009442

PCT Pub. Date: Jan. 29, 2004

(65) Prior Publication Data

US 2005/0001097 A1    Jan. 6, 2005

(30) Foreign Application Priority Data

Jul. 19, 2002    (FR) .................................. 02 09180

(51) Int. Cl.
*B64D 11/00* (2006.01)

(52) U.S. Cl. ................... 244/118.5; 244/118.6; 105/315; 105/329.1; 105/344

(58) Field of Classification Search ............. 244/118.5, 244/118.6; 105/314, 315, 316, 329.1, 344
See application file for complete search history.

(56) References Cited

U.S. PATENT DOCUMENTS

| | | | | |
|---|---|---|---|---|
| 1,731,531 A | | 10/1929 | Gott | |
| 2,147,011 A | * | 2/1939 | Crawford | .................... 105/315 |
| 2,309,665 A | | 2/1943 | Parke | |
| 2,462,027 A | | 2/1949 | Murphy | |
| 2,632,408 A | * | 3/1953 | Giles | .......................... 105/344 |
| 2,650,368 A | * | 9/1953 | Evans | ............................. 52/34 |
| 2,760,442 A | * | 8/1956 | Murphy | ..................... 105/315 |
| 2,914,001 A | * | 11/1959 | Murphy | ..................... 105/315 |
| 2,914,002 A | * | 11/1959 | Murphy | ..................... 105/315 |
| 2,946,294 A | * | 7/1960 | Murphy | ..................... 105/315 |
| 2,963,988 A | * | 12/1960 | Murphy | ..................... 105/315 |
| 2,983,230 A | * | 5/1961 | Murphy | ..................... 105/315 |

(Continued)

FOREIGN PATENT DOCUMENTS

DE    18 11 637    6/1970

(Continued)

*Primary Examiner*—J. W Eldred
(74) *Attorney, Agent, or Firm*—Oblon, Spivak, McClelland, Maier & Neustadt, P.C.

(57) ABSTRACT

An aircraft cabin module for passengers that includes two transverse walls extending from a longitudinal cabin wall up to a longitudinal aisle, at least one of the transverse walls including a transparent portion. A longitudinal wall separates the cabin module from the aisle. At least one service module is arranged between the two transverse walls, more or less symmetrically in relation to a transverse median plane, defining with the walls of the module two contiguous personal spaces. An access is provided from the aisle to each personal space, and at least one seat is provided in each personal space, each seat having at least one configuration in which it is positioned parallel to the cabin wall. Each personal space includes elements capable of forming a bedding surface for at least one passenger.

41 Claims, 2 Drawing Sheets

U.S. PATENT DOCUMENTS

Figure 1:
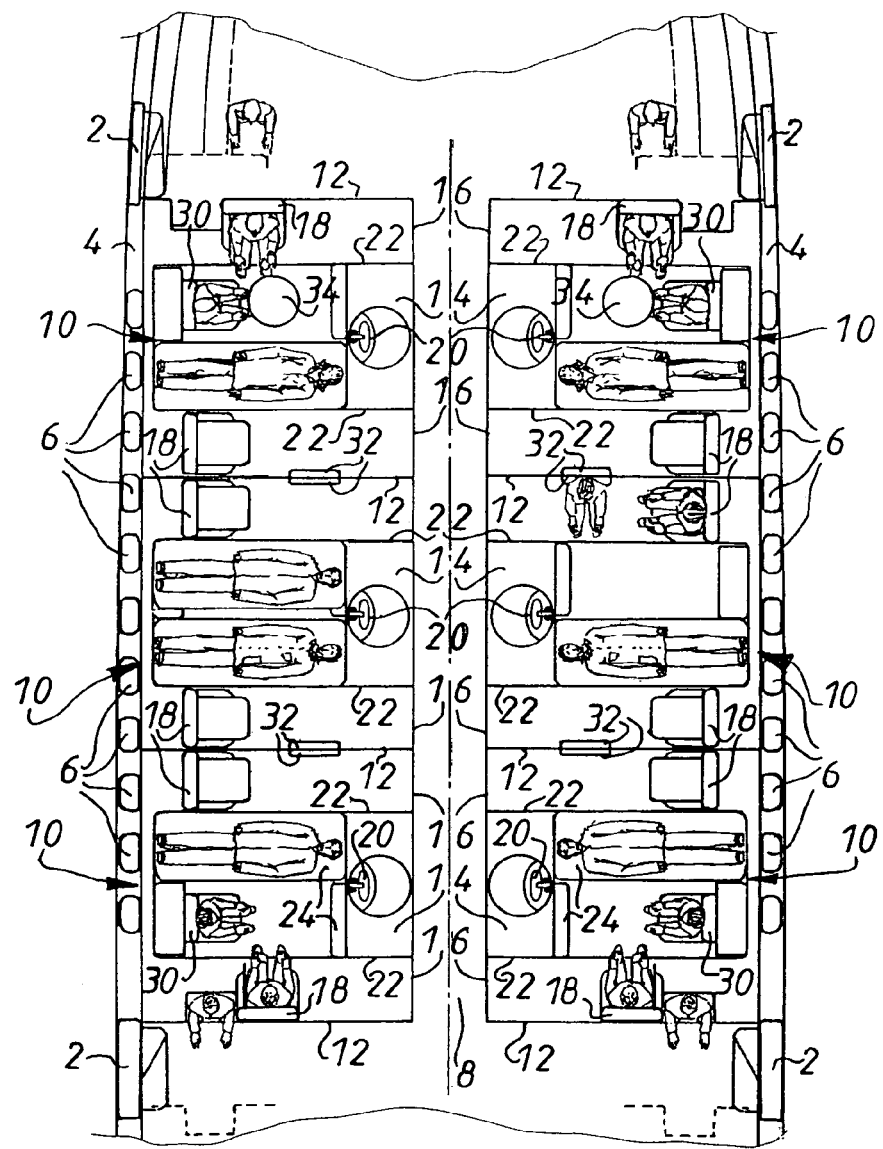

| | | | | |
|---|---|---|---|---|
| 2,995,095 | A * | 8/1961 | Murphy | 105/315 |
| 3,623,285 | A * | 11/1971 | Kelly | 52/36.2 |
| 4,161,914 | A * | 7/1979 | Marsh | 105/344 |
| 4,458,864 | A * | 7/1984 | Colombo et al. | 244/118.5 |
| 4,589,612 | A * | 5/1986 | Halim | 244/118.6 |
| 4,597,549 | A * | 7/1986 | Ryan | 244/118.5 |
| 5,024,398 | A * | 6/1991 | Riedinger et al. | 244/118.5 |
| 5,426,900 | A * | 6/1995 | Springer | 52/79.1 |
| 5,784,836 | A * | 7/1998 | Ehrick | 52/79.8 |
| 6,003,813 | A * | 12/1999 | Wentland et al. | 244/118.5 |
| 6,056,239 | A * | 5/2000 | Cantu et al. | 244/118.6 |
| 6,152,400 | A * | 11/2000 | Sankrithi et al. | 244/118.5 |
| 6,398,164 | B1 | 6/2002 | Fasse | |
| 6,520,451 | B1 * | 2/2003 | Moore | 244/118.5 |
| 6,615,421 | B2 * | 9/2003 | Itakura | 4/664 |
| 6,932,298 | B1 * | 8/2005 | Mills | 244/118.5 |
| 2002/0062521 | A1 * | 5/2002 | Itakura | 4/664 |
| 2003/0218095 | A1 * | 11/2003 | Saint Jalmes | 244/118.5 |
| 2004/0232283 | A1 * | 11/2004 | Ferry et al. | 244/118.6 |
| 2005/0001097 | A1 * | 1/2005 | Saint-Jalmes | 244/118.6 |
| 2005/0023413 | A1 * | 2/2005 | Saint-Jalmes | 244/118.6 |
| 2005/0067870 | A1 * | 3/2005 | Rezag et al. | 297/354.13 |
| 2005/0150175 | A1 * | 7/2005 | Guigan | 52/36.1 |
| 2005/0161975 | A1 * | 7/2005 | Nieminski et al. | 296/178 |
| 2006/0000947 | A1 * | 1/2006 | Jacob | 244/118.6 |
| 2006/0022087 | A1 * | 2/2006 | Defilla et al. | 244/118.5 |

FOREIGN PATENT DOCUMENTS

| | | |
|---|---|---|
| EP | 0 035 955 | 9/1981 |
| EP | 0 850 834 | 7/1998 |
| FR | 917 909 | 1/1947 |
| FR | 1 002 271 | 3/1952 |
| FR | 2 426 608 | 12/1979 |

* cited by examiner

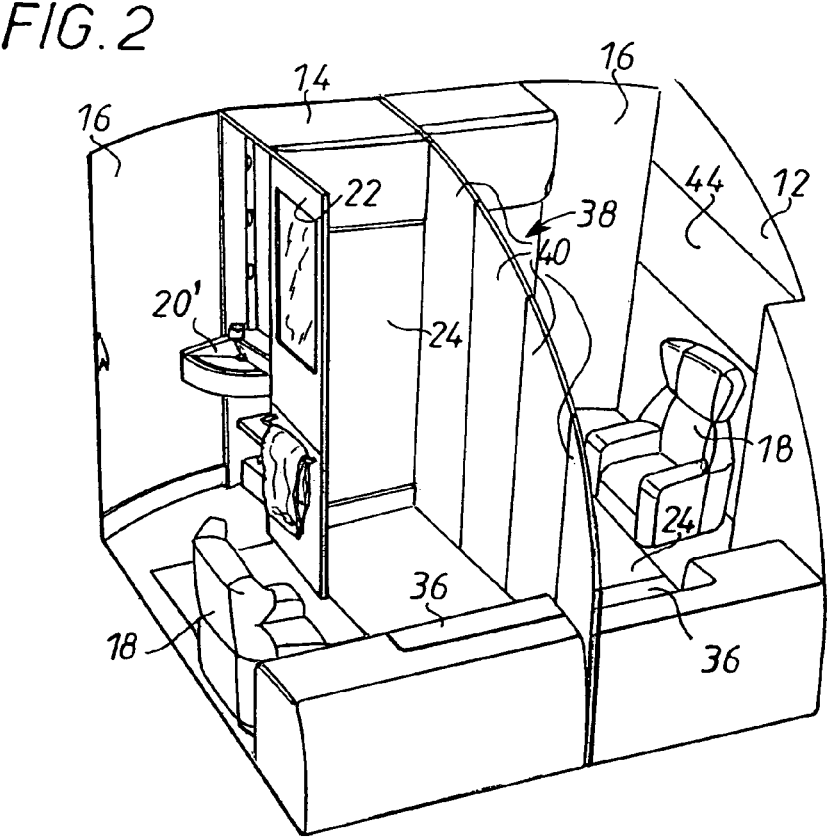
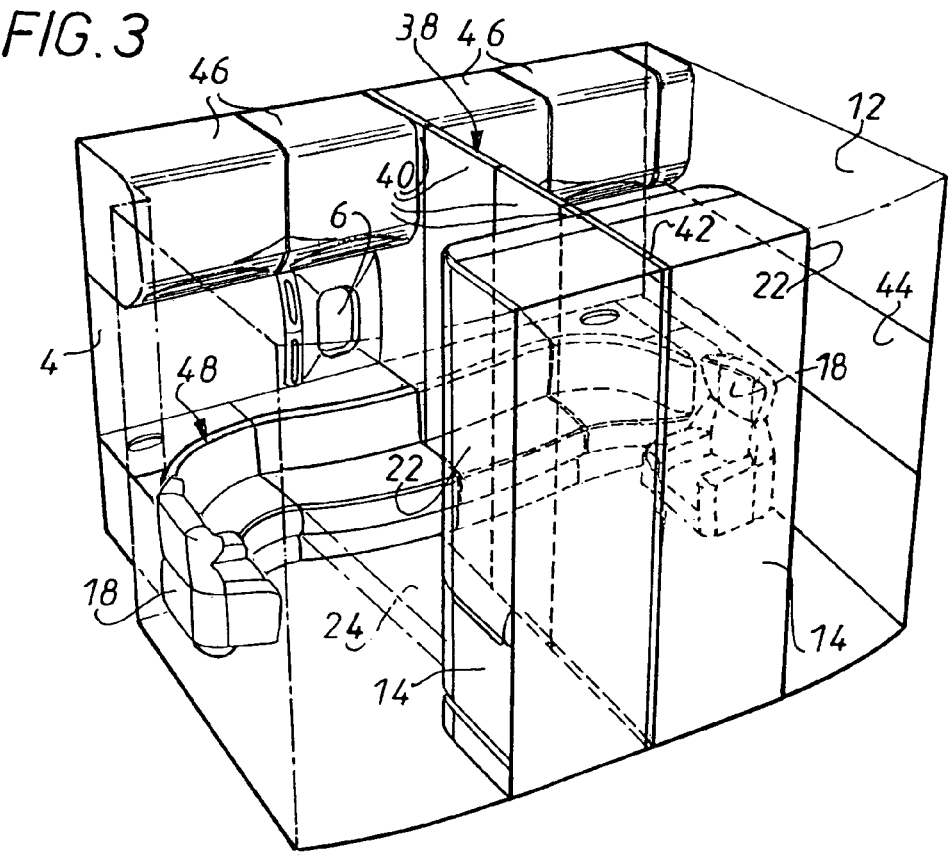

AIRCRAFT CABIN MODULE FOR PASSENGERS

This invention relates to a cabin module for an aircraft.

Present-day aircraft offer different classes of comfort for their passengers. Accordingly, there are more or less comfortable seats (reclining backs, seats with a support provided for the legs, seats convertible into a bed, etc . . . ). The space allotted to each passenger itself is greater or lesser depending on the class.

Travelers thus may enjoy a considerable sleeping-arrangement comfort but do not have, as is the case, for example, in a sleeper train, an enclosed private space.

This is explained by the safety constraints that exist on board an aircraft. Among these constraints, the following will be noted. The passengers must take off and land in seated position, in the direction of movement of the airplane or in the opposite direction. In addition, during these stages of take-off and landing, the crew, itself also settled sitting on a seat positioned longitudinally in relation to the movement of the airplane, must be able to keep an eye on most of the passengers, in particular to see that everything is going well and that, for example, no passenger stands up during these stages of take-off and landing.

To date, therefore, it has been thought that the implementation of individual compartments for one or more passengers was not suitable for an aircraft.

The purpose of this invention, however, is to provide a cabin module for an aircraft making it possible to re-create a space comparable to a compartment such as exists in sleeper trains. Of course, such a module must meet the safety standards established for civil aviation.

To this end, it proposes an aircraft cabin module comprising:
- two transverse walls extending from one longitudinal cabin wall to a longitudinal aisle,
- a longitudinal wall separating the cabin module from the aisle,
- at least one service module arranged between the two transverse walls, more or less symmetrically in relation to a transverse median plane, defining with the walls of the module two contiguous personal spaces,
- an access from the aisle to each personal space,
- at least one seat in each personal space, each seat having at least one configuration in which it is positioned parallel to the cabin wall,
- each personal space comprising elements capable of forming a bedding surface for at least one passenger.

Such a module is compatible with the constraints existing in an aircraft, with respect to size as well as safety.

In order that the passengers may take a seat in the cabin module during the stages of take-off and landing while being visible to the commercial flight crew, it advantageously is provided that at least one of the transverse walls comprises a transparent section.

The service module advantageously is arranged along the aisle, being separated from each transverse wall by a means of an access from the aisle to the module.

In a first embodiment of a module according to the invention, one seat in each personal space is of a convertible type and constitutes the said elements capable of forming the bedding surface. In this case, the seat advantageously is set up pivoting around a vertical axis in such manner that the bedding surface can be positioned crosswise.

In another embodiment, the elements capable of forming a bedding surface comprise, for example, a panel set up pivoting between a more or less vertical position turned up against the service module and a more or less horizontal turned-down position. In this other embodiment, the elements capable of forming a bedding surface further comprise, for example, a more or less horizontal support surface arranged along the cabin wall and cooperating with the pivoting panel when the latter is in turned-down position to form the bedding surface. It can be provided that this support surface forms a seat possibly equipped with a back.

In a variation, a second seat is provided in each personal space. This second seat can be a foldaway or other seat, and preferably is positioned perpendicular to the cabin wall against same. In the latter case, a corner seat can be arranged between the two seats in order to connect them and thus form a corner banquette.

A preferred mode of embodiment provides that a movable or removable partition is available to separate the two personal spaces at will, extending between the cabin wall and the opposite longitudinal wall. This partition advantageously is made up of several telescopic sections extensible transversely, the latter preferably folding back toward the service module when the service module is centered in relation to the transverse walls and arranged along a longitudinal wall. A housing then advantageously is provided in the service module to accommodate the telescopic sections in folded-back position. This housing is implemented, for example, in a transverse separation wall of the service module. The same as the transverse walls of the module, the movable partition itself also can comprise a transparent portion.

The transparent portions implemented in the transverse walls and in a possible movable partition preferably can be obscured. Thus, during the stages of take-off and landing, the transparent portions remain transparent, and during cruising, these portions are obscured. A preferred mode of embodiment provides that at least one transparent portion comprises a liquid crystal layer combined with means for subjecting this liquid crystal layer to a difference of electric potential, this layer being opaque or translucent depending on the difference of potential applied. It also can be provided that at least one transparent portion is equipped with a shade or similar element.

The service module is, for example, a bathroom facility having at least one water source. The bathroom facility can be equipped with a central washbasin and/or a shower. It also comprises, for example, two access doors, each personal space comprising a door for access to the bathroom facility. In the latter case, the bathroom facility advantageously includes a washbasin for each personal space. Each washbasin then, for example, is movable between a retracted position inside the bathroom facility and an extended position outside the bathroom facility. In this case, the opening of the door for access to the bathroom facility advantageously controls the changeover of the washbasin from its retracted position to its extended position.

The service module also can be a storage space, or else a medical-care module, or else a pantry unit equipped for the passengers' refreshment, or . . . etc. This module can be intended for the use of the passengers traveling in the cabin module, or of the commercial flight personnel, or even of third parties (physicians, . . . ).

The transverse walls, the service module and the seat at least one in number are preferably each equipped with fastening means for their attachment on longitudinal attachment rails arranged in the floor of the cabin. Such rails almost always are provided in airplanes intended for the transport of passengers in order to make possible the attachment of seats. The fastening means used for the elements making up a module according to the invention will be, for example, the same as those customarily used for the attachment of seats, with a possible adaptation.

By way of example, a module according to the invention has a length in the longitudinal direction ranging between 2.0 m and 4.0 m and a width on the floor, in the transverse direction, ranging between 2.3 m and 3.5 m.

This invention also relates to a series of modules such as described hereinabove, aligned one beside the other along a longitudinal aisle, characterized in that each transverse module wall, possibly except for a transverse wall located at one end of the series of modules, comprises a transparent portion and in that the transparent portions are aligned.

In such a series, the said seat of each module of the series having a configuration in which it is positioned parallel to the aisle preferably is more or less in alignment with the transparent portions.

This invention also relates to an aircraft cabin section, characterized in that it comprises at least one module such as described above. This aircraft cabin section comprises, for example, a central aisle on either side of which there is at least one module.

Finally, this invention relates to an aircraft, characterized in that it comprises at least one module according to the invention.

Figure 4:
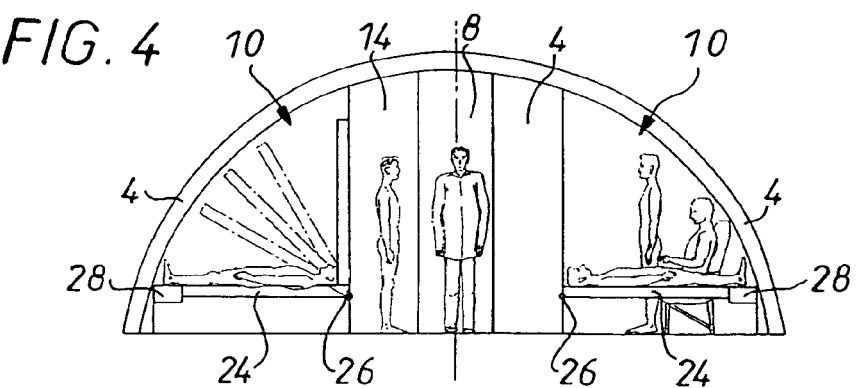

Details and advantages of the invention will emerge more clearly from the description which follows, presented with reference to the attached schematic drawing, on which:

FIG. 1 shows, in a view from above, a series of six cabin modules according to the invention, FIG. 2 shows in perspective an embodiment of a cabin module according to the invention, FIG. 3 shows in perspective another embodiment of a cabin module according to the invention, and FIG. 4 shows schematically in cross section an airplane cabin section equipped with cabin modules according to the invention.

FIG. 1 depicts schematically the habitable space of a section of an airplane cabin. This section is located longitudinally between two successive emergency exits 2. A longitudinal cabin wall 4 delimits this space on both sides of the airplane. Windows 6 are implemented in each cabin wall 4. An aisle 8 extends longitudinally in the center of the cabin section. On either side of this aisle 8 there are, in each case, three modules 10 each intended to accommodate two passengers. The aisle 8 is separated from each module 10 by a longitudinal wall.

The length of the aisle 8 is, for example, approximately 9 m, and its width approximately 0.75 m. Each module 10 then has a length, in the longitudinal direction, of approximately 2.90 m. In the transverse direction, the width of a module 10 is, for example, approximately 2.70 m.

Each module 10 is delimited on the one hand by a floor corresponding to the floor of the cabin and by a ceiling, and on the other hand by the aisle 8, the cabin wall 4 and two transverse walls 12. In certain cases, as for example on FIGS. 2 and 4, the ceiling can consist of the cabin wall 4, because the latter has a circular cylindrical shape. The Figures of the drawing depict modules 10 inside a long mail airplane having two decks. FIGS. 1, 2 and 4 depict modules located on the upper deck, while FIG. 3 depicts a module located on the lower deck. In the modules situated on the upper deck, the ceiling follows the shape of the cabin section, which is rounded, the cabin section being of a general circular cylindrical shape.

Each module 10 is equipped with a lavatory 14, seats and two beds. The module 10 is accessed from the aisle 8 by two doors 16 arranged on either side of the lavatory 14, in each case between the latter and a transverse wall 12. Each module 10 is more or less symmetrical in relation to a transverse median plane parallel to the transverse walls 12 and positioned at an equal distance from the latter. Thus one module is formed from two half-modules each intended for one passenger and defining a personal space for the latter. Each half-module is equipped with a pivoting seat 18, a second seat and a bed.

Each lavatory 14 is of an overall parallelepipedal shape. It has two large longitudinal walls and two small transverse walls. It is equipped with a washbasin 20. The lavatory 14 is accessed by two doors 22 implemented in the small transverse walls of the lavatory. Thus is it possible to access the lavatory 14 of a module from each of the half-modules thereof.

Each bed depicted on FIG. 1 is implemented in two parts, as can be seen on FIG. 4. A first part 24 is set up pivoting around a horizontal axis 26 and a second stationary part 28 is arranged along the cabin wall 4. The first part 24 pivots between a vertical turned-up position along the longitudinal wall of the lavatory 14 situated inside the module 10 and a horizontal turned-down position in which it extends from the lavatory 14 toward the cabin wall 4 up to the stationary part 28.

When the pivoting first part 24 is in its turned-up position, the stationary part 28 also can be used as a seat for a visitor. If the roundness of the cabin wall 4 does not make it possible to use this stationary part 28 of the bed as a seat, it is possible to place another seat 30 in front of the stationary part 28 of the bed. This seat 30 then has, for example, a back which can be folded so as not to hinder the swinging motion of the pivoting first part 24 of the bed until it is in its horizontal position.

In each module 10 depicted on FIG. 1, there are two pivoting seats 18, one in each personal space. These seats can pivot 90° (at least) so as to be able to be positioned longitudinally, in particular for the stages of take-off and landing of the airplane, and be positioned transversely according to the desire of the passenger during flight. Certain seats 18 of FIG. 1 are depicted in a longitudinal position, while others are depicted in a transverse position.

The presence of foldaway seats 32 also is noted in the modules 10 of FIG. 1. These preferably are arranged along a transverse wall 12. Thus they are accessible even when the bed is horizontal. In certain modules 10, a table 34 also is depicted. This table 34 can serve as a base for the pivoting part 24 of the bed when the latter is in its turned-down position. Then one need only choose the height of the table judiciously so that it supports the movable part 24 of the bed in horizontal position.

FIG. 2 shows in perspective, with more details, an interior layout of a module 10. It concerns a module different from those depicted on FIG. 1. The same references, however, are used to designate similar elements.

Accordingly in this module 10 there is a lavatory 14 arranged along a longitudinal wall between two doors 16, a pivoting seat 18 and a bed in two parts. The module also is delimited by two transverse walls 12 and the cabin wall 4. One transverse wall 12, however, and the cabin wall 4 have not been depicted on this FIG. 2 in order to make it possible to better visualize the interior of the module 10.

The bed is of a configuration slightly different from that described in reference to FIG. 1. Here there is a pivoting part 24 turning up in a vertical position against the lavatory 14 cooperating with another part 36 to form the bed. In the case of this Figure, the other part 36 of the bed also is pivoting.

It pivots around a horizontal axis parallel to the pivoting axis 26 of the pivoting part 24 which is more or less longer than the complementary part 36. This part 36 of the bed can serve as a foldaway seat when the pivoting part 24 of the bed is turned up against the lavatory 14. It thus constitutes a second available seat within each personal space inside module 10.

On FIGS. 2 and 3, there is noted in particular the presence of a movable partition 38, parallel to the transverse walls 12 and separating the two personal spaces of the module 10. It concerns a telescopic partition implemented in several segments 40. In folded-up position, the segments 40 are superposed on each other and are housed in the lavatory 14. A housing 42 is provided therein for this purpose.

In the two examples of implementation of a movable partition 38 depicted in the drawing, the segments 40 fold up, sliding on the floor so as to be stored in their housing 42. It also may be planned to have a suspended movable partition which slides along a rail implemented on the ceiling. In the configuration of FIG. 2, in which the ceiling is not horizontal, the partition 38 then could have elements in the form of disk portions. In order to come into housing 42, these disk portions would pivot around a horizontal axis close to the floor and to the housing 42.

Housing 42 is implemented in a transverse wall which divides the lavatory 14 in two. This lavatory then is equipped here with two folding washbasins 20'. When the access door 22 of a personal space of module 10 to the lavatory 14 is closed, the washbasin 20' is turned up to vertical position in the lavatory 14, and when the door 22 is opened, the washbasin 20' can be turned down and assumes a horizontal position, projecting outside the lavatory 14. The passenger using the washbasin 20' thus has more space because he does not have to go inside the lavatory 14.

The transverse walls 12 here all are equipped with a transparent portion 44, thus making it possible for a member of the airplane crew to keep an eye on the passenger(s) located in the module 10, in particular during the stages of take-off and landing of the airplane. This transparent portion 44 is in the form of a horizontal strip centered at approximately ⅔ of the height of the transverse wall 12. As may be seen on FIG. 1, when several modules 10 are aligned, provision is made to align the transparent portions 44 so that a member of the crew seated in line with the modules can see inside each one of the latter and thus attend to the safety of the passengers located in the modules (cf. FIG. 1), in particular during the stages of take-off and landing of the airplane. During these stages, the passengers are settled in a seat positioned longitudinally (and equipped with a safety belt). The transparent portions 44 then are positioned on the transverse walls 12 so as to see these seats, at least in part. There is an alignment, therefore, between the transparent portions 44 and the seats intended to accommodate the passengers during the stages of take-off and landing.

As depicted in particular on FIG. 1, provision can be made in the transverse walls 12 located near an emergency exit 2, for a recess to accommodate a seat for a steward or stewardess during the stages of take-off and landing or else even during evacuation of the aircraft.

For a transverse wall 12 located at the end of a line-up of modules 10, it can be pointless to provide a transparent portion 44 or else even in the case of an isolated module, only one transparent portion 44 can be contemplated. In practice, however, it is preferable to have a transparent portion on all the transverse walls 12.

During flight, these transparent portions advantageously are able to be made opaque or obscured. Different means can be used to this end. For example, provision can be made for shades, blinds, curtains, shutters, or similar elements. Each passenger in his module then can choose to obscure or not to obscure the transparent wall 44 of his personal space. In a preferred embodiment, the transparent portions 44 comprise a liquid crystal layer and means making it possible to subject this layer to a difference of electric potential. These liquid crystals have the property of becoming opaque when they are positioned in a certain manner, this positioning being obtained by electric excitation. During the stages of take-off and landing, the transparent portions 44 are such that the crew can see the passengers inside the modules, while during the rest of the flight these transparent portions are made opaque.

FIG. 3 shows another possibility for layout of a module 10. In the case of this format, as indicated above, the module 10 is situated on the lower deck of the airplane. The cabin wall 4 then is approximately vertical. Provision then can be made for baggage compartments 46 in the top portion of the cabin wall 4. It also is possible to make provision for storage space in the lavatory 14 or else along the cabin wall in low position.

The seat 18 intended to accommodate the passenger during the stages of take-off and landing is not pivoting here, but remains stationary. It is supplemented by a corner seat 48 and by the portion of the bed arranged on the cabin wall 4 side to form a corner banquette.

In all these variations of embodiment described hereinabove, the various elements making up each module 10 (the transverse walls 12, the seats, the lavatory 14, etc . . . ) are fastened to the floor on attachment rails. Used here are the attachment rails which are provided for the attachment of seats in every airplane intended for transport of passengers. A series of longitudinal rails is provided throughout the width of the cabin. Regularly spaced anchoring points (usually every inch, or with a distance of 2.54 cm) along each rail are provided for attachment of the seats. The means of attachment for the various elements making up the modules are identical to those classically used for the fastening of seats on the rails.

This invention is not limited by the embodiments described hereinabove by way of nonrestrictive examples. It also relates to all the variations of embodiment within the reach of the individual skilled in the art, in the context of the claims hereinbelow.

Thus, for example, numerous outfitting variations can be provided in the modules.

The seat intended to accommodate the passenger during the stages of take-off and landing and arranged longitudinally during these stages can be, for example, a seat convertible to a bed. In the case of this format, it then is not necessary to provide a separate bedding surface. This seat also can be moved around in the module. It was seen above that this seat could pivot, but provision also can be made so that it can be moved.

The description presented hereinabove is given with reference to an airplane comprising two decks, which implies for each deck an under-ceiling height for each deck which is limited. Accordingly, the embodiments described provide for a bed in two parts. With a greater under-ceiling height, however, having a bed with a sole part also could be contemplated.

The layout of the lavatory can be different from what is described hereinabove. Outfitting this bathroom space with a shower or else even a WC can be contemplated.

It is possible to provide a different facility instead of the lavatory. This space can be used, for example, as a storage space, for the personal effects of the passengers traveling in the corresponding cabin module, or else for storage for the commercial flight personnel. In the latter case, storing trolleys (or carts) in these spaces can be contemplated. This then makes it possible to make room at the site customarily provided for the storage of these trolleys and to put in seating space for other travelers. This space also can be developed as a pantry unit (generally designated by the English term "galley"). Preparing a special dish at the request of the passenger traveling in the cabin module then can be contemplated. Same then can be prepared on the spot and served immediately.

The cabin module also may be used for the repatriation of an ill or injured person. In this case, the lavatory described above advantageously is replaced by an area containing medical apparatus.

The lavatory or any service module, is not inevitably arranged along the aisle, or centered in relation to the two transverse walls of the module. This service module, for example a lavatory, also could be located along the cabin wall. In this case, this service module is provided more for the use of the passengers traveling in the cabin module.

Providing two service modules, one in each personal space of the cabin module, likewise can be contemplated. These service modules then preferably are arranged symmetrically in relation to a transverse median plane of the cabin module. These service modules then, for example, can each be arranged in a corner of the cabin module.

The movable partitions described do not comprise a transparent portion. As a matter of fact, provision is made to retract them into their housing during the stages of take-off and landing. Nonetheless, if such a movable partition is to be able to remain closed during these stages of take-off and landing, a transparent portion, aligned with the transparent portions of the transverse walls, preferably will be provided.

The invention claimed is:

1. Aircraft cabin module comprising:
   two transverse walls that extend in parallel from a longitudinal cabin wall up to a longitudinal aisle;
   a longitudinal wall separating the cabin module from the aisle;
   at least one service module arranged between the two transverse walls, substantially symmetrically in relation to a transverse median plane, defining with the walls of the module two contiguous personal spaces;
   an access from the aisle to each personal space; and
   at least one seat in each personal space, each seat having at least one configuration in which it is positioned parallel to the cabin wall.

2. A module according to claim 1, wherein at least one of the two transverse walls comprises a transparent portion.

3. A module according to claim 1, wherein the at least one service module is arranged along the aisle, being separated from each transverse wall by an access from the aisle to the module.

4. A module according to claim 1, wherein one seat of each personal space is of a convertible type and constitutes elements configured to form a bedding surface.

5. A module according to claim 4, wherein the one seat is set up pivoting around a vertical axis such that the bedding surface can be positioned crosswise.

6. A module according to claim 1, wherein each personal space comprises elements configured to form a bedding surfaces, and the elements configured to form the bedding surface comprise a panel set up pivoting between a substantially vertical position turned up against the service module and a substantially horizontal turned-down position.

7. A module according to claim 6, wherein the elements configured to form the bedding surface further comprise a substantially horizontal support surface arranged along the cabin wall and cooperating with the pivoting panel when the pivoting panel is in the turned-down position to form the bedding surface.

8. A module according to claim 7, wherein the support surface forms a seat configured to be equipped with a back.

9. A module according to claim 1, wherein a second seat is provided in each personal space.

10. A module according to claim 9, wherein the second seat is a foldaway seat.

11. A module according to claim 9, wherein the second seat is positioned perpendicular to the cabin wall against the cabin wall.

12. A module according to claim 11, wherein a corner seat connects the first and second seats thus forming a corner banquette.

13. A module according to claim 1, further comprising a lengthwise-vertically, movable or removable, partition to separate the two personal spaces, extending between the cabin wall and the opposite longitudinal wall.

14. A module according to claim 13, wherein the partition is made of plural telescopic sections extensible transversely.

15. A module according to claim 14, wherein the service module is centered in relation to the transverse walls and is arranged along a longitudinal wall, and wherein the telescopic sections fold up toward the service module.

16. A module according to claim 15, wherein the telescopic sections are housed in folded position in the service module.

17. A module according to claim 16, wherein the service module comprises a transverse separation wall having a housing to accommodate the telescopic sections of the movable partition.

18. A module according to claim 13, wherein the movable partition comprises a transparent portion.

19. A module according to claim 2, wherein the transparent portion implemented in the at least one of the two transverse walls can be obscured.

20. Aircraft cabin module comprising:
    two transverse walls extending from a longitudinal cabin wall up to a longitudinal aisle;
    a longitudinal wall separating the cabin module from the aisle;
    at least one service module arranged between the two transverse walls, substantially symmetrically in relation to a transverse median plane, defining with the walls of the module two contiguous personal spaces;
    an access from the aisle to each personal space; and
    at least one seat in each personal space, each seat having at least one configuration in which it is positioned parallel to the cabin wall,
    wherein each personal space comprising elements configured to form a bedding surface for at least one passenger,
    wherein at least one of the two transverse walls comprises a transparent portion,
    wherein the transparent portion implemented in the at least one of the two transverse walls can be obscured, and
    wherein at least one transparent portion comprises a liquid crystal layer to be subjected to a difference of electric potential, the liquid crystal layer being opaque or translucent depending on the difference of potential applied.

21. A module according to claim 19, wherein at least one transparent portion is equipped with a shading element.

22. A module according to claim 1, wherein the service module is a bathroom facility having at least one water source.

23. A module according to claim 22, wherein the bathroom facility is equipped with a central washbasin.

24. A module according to claim 22, wherein the bathroom facility is equipped with two access doors, each personal space comprising a door for access to the bathroom facility.

25. A module according to claim 24, wherein the bathroom facility comprises a washbasin for each personal space.

26. Aircraft cabin module comprising:
two transverse walls extending from a longitudinal cabin wall up to a longitudinal aisle;
a longitudinal wall separating the cabin module from the aisle;
at least one service module arranged between the two transverse walls, substantially symmetrically in relation to a transverse median plane, defining with the walls of the module two contiguous personal spaces;
an access from the aisle to each personal space; and
at least one seat in each personal space, each seat having at least one configuration in which it is positioned parallel to the cabin wall,
wherein each personal space comprising elements configured to form a bedding surface for at least one passenger,
wherein the service module is a bathroom facility having at least one water source,
wherein the bathroom facility is equipped with two access doors, each personal space comprising a door for access to the bathroom facility,
wherein the bathroom facility comprises a washbasin for each personal space, and
wherein each washbasin is movable between a retracted position inside the bathroom facility and an extended position outside the bathroom facility.

27. A module according to claim 26, wherein opening of the access door for access to the bathroom facility controls changeover of the washbasin from its retracted position to its extended position.

28. A module according to claim 22, wherein the bathroom facility is equipped with a shower.

29. A module according to claim 1, wherein the service module is a storage space.

30. A module according to claim 1, wherein the service module is a medical care module.

31. A module according to claim 1, wherein the service module is a pantry unit equipped for passengers' refreshment.

32. A module according to claim 1, wherein the two transverse walls, the service module, and the at least one seat are each equipped with means for their attachment on longitudinal attachment rails arranged on a floor of the cabin.

33. A module according to claim 1, wherein the module has a length in the longitudinal direction ranging between 2.0 m and 4.0 m, and a width on the floor, in the transverse direction, ranging between 2.3 m and 3.5 m.

34. A series of modules according to claim 1, aligned one beside another along a longitudinal aisle, wherein a plurality of transverse module walls includes a subset of transverse module walls and a last transverse module wall, wherein at least the subset of transverse module walls has each wall include a transparent portion, and wherein each transparent portion is aligned with each other.

35. A series according to claim 34, wherein the seat of each module of the series of modules is configured parallel to the aisle and located substantially in alignment with the transparent portion.

36. A section of an aircraft cabin, comprising at least one module according to claim 1.

37. A section of an aircraft cabin according to claim 36, comprising a central aisle on either side of which is at least one module.

38. An aircraft, comprising at least one module according to claim 1.

39. A module according to claim 1, wherein each personal space comprising elements configured to form a bedding surface for at least one passenger.

40. A module according to claim 1, wherein at least one of the two transverse walls comprises an electrochromatic window.

41. A module according to claim 1, further comprising a washbasin that is movable between a retracted position inside the service module and an extended position outside the service module.

* * * * *